T. Thatcher,
Steam Pump.
No. 2,256. Reissued May 22, 1866.
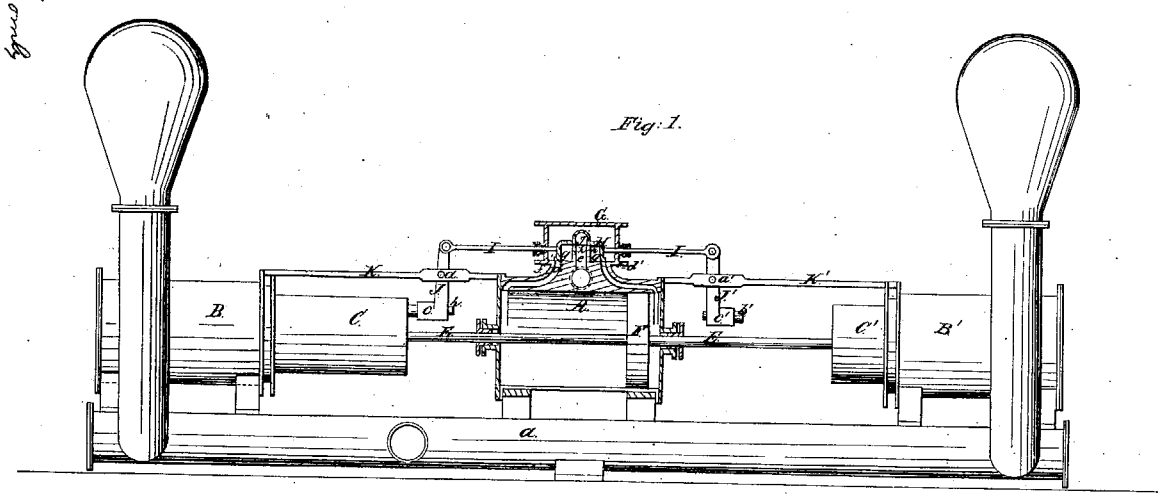
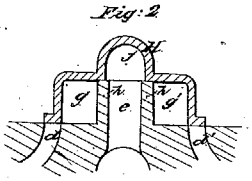
Witnesses:
J. W. Coombs
Thos. Douglas
Inventor:
Thos Thatcher
per Munn & Co
Attorneys
N. PETERS, PHOTO-LITHOGRAPHER, WASHINGTON, D. C.

UNITED STATES PATENT OFFICE.

THOMAS THATCHER, OF DANVILLE, PENNSYLVANIA.

IMPROVEMENT IN DIRECT-ACTION ENGINES.

Specification forming part of Letters Patent No. 40,778, dated December 1, 1863; Reissue No. 2,256, dated May 22, 1866.

*To all whom it may concern:*

Be it known that I, THOMAS THATCHER, of Danville, in the county of Montour and State of Pennsylvania, have invented a new and useful Improvement in Direct-Action Steam-Engines for Pumping and other Purposes; and I do hereby declare that the following is a full, clear, and exact description of the same, reference being had to the accompanying drawings, forming part of this specification, in which—

Figure 1 is a longitudinal elevation of a steam-pump having my invention applied, the cylinder and valve-chest being shown in section to illustrate part of the improvement. Fig. 2 is a longitudinal section of the valve and seat on a larger scale than Fig. 1.

Similar letters of reference indicate corresponding parts in both figures.

To enable others skilled in the art to make and use my invention, I will proceed to describe its construction and operation.

A is the steam-cylinder, arranged horizontally between and in line with two pump-cylinders, B B′, whose plungers C C′ are connected with the same rod E to which the steam-piston F is attached. The steam-cylinder and the pump-cylinders are all supported upon hollow tubes *a*, which form the bed-plate of the whole machine, and also serve as supply-pipes for the pumps.

G is the valve-chest, and H the valve. I is the valve-stem passing through stuffing-boxes in both ends of the steam-chest, and connected at each end with the upper end of one of two tappet-levers, J J′, which are attached, by their respective fulcrum-pins *a a′*, to two stationary bars, K K′, connecting the steam-cylinder and pump-cylinders and constituting part of the framing of the engine. The lower ends of these levers are made with sockets *c c′*, which are fitted with pins *b b′*, to which are applied india-rubber or other springs to prevent the sudden concussion to which the levers would be liable by the pump-plungers striking directly against them, the said plungers operating upon the said levers to produce the first part of the stroke of the valve, by which the valve is made to close the induction-port and shut off the steam from the cylinder.

The steam-ports *d d′* and exhaust-port *e* are arranged in the usual manner, except that they are somewhat farther apart than usual, and there is provided around the exhaust-port a deep raised rim or casing, *h*, the upper part of which is finished perfectly flat and parallel with the valve-seat *f* below, to form a second seat.

The valve H is made with a cavity, *g*, which is of a depth equal to the height of the rim *h*, of a width sufficient to enable it to work on the sides of the said rim, and of a length sufficient to permit the necessary longitudinal movement of the valve; and above or at the back of this cavity, and at equal distances from the ends thereof, there is a second cavity, *j*, the length of which in a direction lengthwise of the valve is equal to or a little greater than the length of the mouth of the exhaust-port in the same direction, and the width of which corresponds with that of the exhaust-port. The top of the cavity *g* is flat and faced to work steam-tight on the upper surface of the rim *h* while the face of the valve works steam-tight upon the seat *f*. The ports *d d′* and the cavity *g* are so constructed as to give what is termed "lead" to the exhaust.

The operation of the valve is as follows: As the piston F approaches the end of its stroke in either direction one of the plungers C C′ strikes the pin *b* or *b′* of its respective lever J or J′ and drives the lower end of the said lever toward the cylinder, and so by moving the upper end of the said lever in the other direction moves the valve H in the opposite direction to which the piston F is moving and brings it to a position to close the port *d* or *d′*, through which steam has been entering the cylinder, and the lead that is provided for the exhaust then permits the steam to issue from the cylinder through the same port into the cavity *g* of the valve, where it acts between the rim *h* and one end of the said cavity *g*, to complete the stroke of valve by its pressure against the said end of the said cavity. The exhaust takes place through the cavity *j*, which is always in communication with the exhaust-port *e*, and which is brought into communication with the cavity *g* by its end passing over the outer edge of the rim *h*. In Figs. 1 and 2 the piston is supposed to be completing its stroke to the right, and the plunger C has moved the lever J far enough to the left to have brought the valve over all the ports and to have shut off the steam in the chest from the cylinder, and has just commenced opening the port *d* to the cavity, and the steam is just commencing to exhaust through the said port into the cavity *g*, against the left-hand end of which it will press with such force as to quickly complete the stroke of the valve and open the port *d'* to the steam and form a communication between the port *d* and the exhaust-port *e* by bringing the cavity *j* into contact with the chamber formed in the cavity *g* at the left of the rim or casing *h*, which may be said to divide the cavity *g* into two chambers, one or other of which is always shut off from the cavity *j*. As the piston completes its stroke in the other direction the lever J' is acted upon by the plunger C' to move the valve to the right to the position to cover the ports, and the exhaust-steam then escapes into the right hand chamber of the cavity *g* of the valve, and by an action similar to that above described, but in the opposite direction, the movement of the valve to the right is completed.

In the above operation the levers J and J' both move together and with the valve, both being connected by the valve-stem.

In order to prevent the too sudden action of the steam upon the valve when first admitted into either chamber of the cavity *g*, I propose to make the said cavity fit loosely to the sides of the rim *h h*, in order that there may be a slight escape of steam between them to form a cushion in the other chamber.

Instead of having the pump-plungers act upon the levers J J', tappets may be attached to the piston-rod for the same purpose. In case of but one pump being provided there will be a tappet on one side of the plunger made to perform the same duty on the other side.

What I claim as my invention, and desire to secure by Letters Patent, is—

1. The two tappet-levers J J', applied and combined with each other, with the valve, and with the plungers C C', substantially as herein specified.

2. The rim or casing *h h* around the exhaust-port of the valve-seat, in combination with the two cavities *g* and *j* in the valve, substantially as and for the purpose herein specified.

3. The arrangement of the cylinder A, pump-cylinders B B', plungers C C', rod E, piston F', and tubes *a*, constructed and operating in the manner and for the purpose herein described.

THOMAS THATCHER.

Witnesses:
C. CORNELISON,
JOHN DODSON.